PHASE CONTROLLED OSCILLATOR SYSTEM UTILIZING VARIABLE GAIN IN THE PHASE CONTROL LOOP

Filed Dec. 13, 1967 2 Sheets-Sheet 1

INVENTOR
W. KAMINSKI
BY Alfred G. Steinmetz
ATTORNEY

Oct. 28, 1969 W. KAMINSKI 3,475,695

PHASE CONTROLLED OSCILLATOR SYSTEM UTILIZING VARIABLE GAIN IN THE PHASE CONTROL LOOP

Filed Dec. 13, 1967 2 Sheets-Sheet 2

United States Patent Office 3,475,695
Patented Oct. 28, 1969

3,475,695

PHASE CONTROLLED OSCILLATOR SYSTEM UTILIZING VARIABLE GAIN IN THE PHASE CONTROL LOOP

William Kaminski, West Portal, N.J., assignor to Bell Telephone Laboratories, Incorporated, Murray Hill, N.J., a corporation of New York Filed Dec. 13, 1967, Ser. No. 690,208
Int. Cl. H03b 3/04
U.S. Cl. 331—25 9 Claims

ABSTRACT OF THE DISCLOSURE

A phase controlled oscillator system limits phase comparison in the phase control loop to an interval of time substantially less than the period of the oscillator. During the short interval of phase comparison, the gain of the phase control loop is increased significantly by using a high gain comparator function. During capture to achieve phase lock, the duration of the phase comparison interval is increased by increasing the comparator function duration to increase the capture range.

FIELD OF THE INVENTION

This invention relates to phase controlled oscillator systems and more particularly to a phase controlled oscillator system with variable gain in the phase control loop to accommodate various operating conditions therein.

BACKGROUND OF THE INVENTION

A phase controlled oscillator system is a control system to establish and maintain a fixed phase relationship between the signal output of the controlled oscillator and a reference frequency signal. The fixed phase relationship is achieved by applying the signal output of the oscillator and the reference frequency signal to a phase comparator and utilizing a phase error signal indicative of the comparison to control the frequency of the oscillator.

The phase controlled oscillator is typically used to generate signals in situations where a signal with a highly stable frequency is necessary. One particular application is a transmitter frequency source for a mobile radio system, wherein a plurality of mobile radio transmitter frequency sources are phase locked with a master frequency source to insure a highly stable frequency output at each transmitter.

The ability of a phase controlled oscillator system to maintain a highly stable frequency output is largely dependent upon the amount of noise existing in the phase control loop and the gain of the phase control loop. The factors determining the gain of the phase control loop are the phase comparator characteristic, the voltage control characteristics of the oscillator and any D.C. amplification means included in the phase control loop. The phase comparator characteristic is the signal function output of the phase comparator in response to the phase difference between the signal output of the controlled oscillator and the reference frequency signal. The type of signal function output of the phase comparator is dependent upon the manner in which the phase comparator operates. This signal function in the case of a sampling type comparator, for instance, is identical to the signal input waveform to the sampler. The gain of a phase control loop due to the phase comparator characteristic is measured by the change in the phase error control signal occurring in response to a given phase deviation between the controlled oscillatory signal and a reference frequency signal.

The gain of the phase control loop is an important factor in determining its frequency range of response during the capture and phase lock conditions of the system. If the gain of the phase control loop is too low, jitter introduced by noise in the phase control loop may cause the oscillator to disengage from its locked condition. The gain of the phase control loop may be increased by inserting amplifiers therein; however, these amplifiers also amplify the noise level existing in the phase control loop.

The typical phase controlled oscillator system utilizes a sinusoidal comparator function in the phase control loop. With such a comparator function, the gain of the loop is relatively high at the angle $\pi$ of the function due to a high gain slope at this point. This high gain slope is limited, however, to considerably less than a full cycle of the comparator function. The balance of the sinusoidal comparator function is nonlinear or comprises an unstable region with a reversed comparator function slope. Hence the linear phase error response of the phase control loop is limited to a narrow range of the comparator function which limits the capture and lock ranges.

A ramp comparator function provides a linear gain over the entire function duration and increases the lock range as compared to the above described sinusoidal function. The ramp comparator function is, additionally, stable over its entire range of operation. However, the gain of the phase control loop utilizing a ramp function is limited by the maximum ramp function slope attainable. This maximum slope is in turn limited by the ramp function amplitude. The ramp comparator function as applied to a phase controlled oscillator system is discussed in detail by C. J. Byrne in the Bell System Technical Journal, vol. 41, pp. 559–602, March 1962.

While it is desirable to have a high gain in the phase control loop, it is undesirable to limit the capture and lock ranges of the system or to increase the noise level in the phase control loop by the addition of amplifiers. It is also undesirable to limit the gain in the phase control loop by the attainable comparator function amplitude.

It is therefore an object of the invention to increase the phase control loop gain without increasing the amplitude of the comparator function.

It is another object of the invention to increase the phase control loop gain without amplifying the noise level in the phase control loop.

It is still another object of the invention to permit the variation of the capture range and loop gain in the phase control loop to accommodate the various operating conditions of capture and lock.

SUMMARY OF THE INVENTION

Therefore in accordance with the invention, a phase controlled oscillator system utilizes a variable duration ramp comparator function to variably control the comparator range of operation and the gain of the phase control loop. The variable duration ramp comparator function is generated in response to the signal output of the phase controlled oscillator. The normal duration of the ramp comparator function is selected to be considerably less than the period of the signal output of the phase controlled oscillator. The slope of the ramp comparator function and hence the gain it imparts to the phase control loop is measurably increased over that of a ramp comparator function of equal amplitude whose duration equals the period of the signal output of the oscillator.

The ramp comparator function is sampled in response to a reference frequency signal. These ramp function samples are utilized to generate phase error signals to control the frequency of the oscillator. No phase error signal is generated if the sampling does not occur during the duration of the ramp comparator function. During the initial capture operation, the duration of the ramp compartor function is increased to expand the capture range. When locking is achieved, the slope of the ramp comparator function is increased by decreasing the ramp function duration to increase the phase control loop gain.

A feature of the invention is the short duration of the charging slope of the ramp comparator function permitting the existence of passive intervals between successive cycles of the ramp comparator functions. No useful error signals can be generated in these passive intervals and hence no unstable areas of feedback exist between each successive cycle of the ramp comparator function.

DRAWINGS

The many advantages and features of the invention may be more fully appreciated by consideration of the following detailed description taken in connection with the accompanying drawings in which.

DETAILED DESCRIPTION

Figure 1:
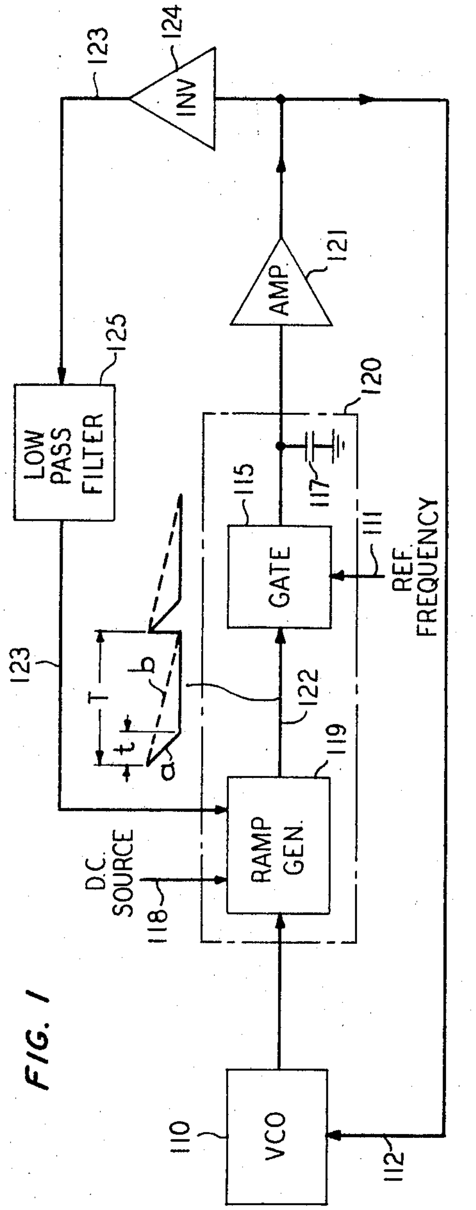
FIG. 1 is a block diagram of a phase controlled oscillator system in accord with the invention.

A phase controlled oscillator system is shown in FIG. 1 including the conventional phase control loop and an auxiliary ramp function duration control loop. The purpose of this phase controlled oscillator system is to maintain a voltage controlled oscillator 110 in some predetermined phase relationship with a reference frequency signal applied to the input terminal 111 of the sampling gate 115 included in the phase comparator 120. The voltage controlled oscillator 110 includes a voltage responsive element which adjusts the oscillator frequency in response to the voltage level of the phase error signal applied to the frequency control input 112.

The output of the voltage controlled oscillator 110 is applied to the phase comparator 120. The phase comparator 120 compares the phase relationship between the voltage controlled oscillator signal output and the reference frequency signal and generates a phase error signal in response to this comparison. This phase error signal is applied, via the isolating amplifier 121, to the frequency control input 112 of the voltage controlled oscillator 110. If the frequency of the voltage controlled oscillator 110 tends to vary from some standard frequency, any change alters the static phase difference between the reference frequency signal and the voltage controlled oscillator signal output. This altered phase difference produces a change in the phase error signal output of the phase comparator 120. This phase error signal change is utilized to counter the tendency of the voltage controlled oscillator 110 to change frequency.

The phase comparator 120 comprises a ramp function generator 119, a samping gate 115, and a storage capacitor 117. The ramp function generator 119 is energized by a direct current bias supply connected to the energizing lead 118. The ramp function generator 119 utilizes the bias supply to charge a storage capacitor included therein to some predetermined voltage level. The stored charge is discharged at a rate established by the control loop lead 123 of the auxiliary control loop. This discharge rate of the auxiliary control loop is in turn controlled by the phase lock conditions of the phase control loop. If the system is in phase lock, the duration of the ramp comparator function is minimized; if the system is out of phase lock, the duration of the ramp comparator function is maximized.

The ramp comparator function generated by the ramp function generator 119 is applied, via lead 122, to the sampling gate 115. The sampling gate 115 transmits samples of the ramp function to the storage capacitor 117 which derives a phase error signal from the samples.

As is apparent in the accompanying waveforms, shown in FIG. 1, the normal ramp function waveform *a*, shown as a solid line, has a short duration *t* as compared to the period T of the signal output of the voltage controlled oscillator 110. The sampling gate 115 gates the ramp function amplitude to the storage capacitor 117 in response to the reference frequency signal applied to it, via input terminal 111. The voltage stored in the storage capacitor 117 represents the phase error signal used to control the frequency of the voltage controlled oscillator 110. As is evident from the illustrated waveform, by limiting the duration of the ramp function, the slope is greatly increased for a given amplitude and hence the gain of the phase control loop is greatly increased.

However, due to the short duration of the ramp comparator function, there is a high probability of the sampling occurring outside the duration of the ramp comparator function when the phase controlled oscillator system is initially starting operation or when it has fallen out of lock. If sampling occurs outside the time duration *t*, no voltage is transmitted to the storage capacitor 117 and hence the phase error signal level drops to zero. The auxiliary control loop utilizes this loss of the phase error signal to increase the duration of the ramp function.

The auxiliary control loop comprises the control loop lead 123, the inverter 124 and the low pass filter 125. The function of the inverter 124 is to change the polarity of the phase error signal to the same polarity as the discharge control voltage in the ramp generator 119, as described below with reference to FIG. 2. The low pass filter 125 damps the auxiliary control loop response to prevent rapid oscillatory changes in the duration of the ramp comparator function.

The inverted phase error signal level, applied to the ramp function generator 110, is utilized to reduce the discharge rate of the charged storage capacitor included therein. The reduced discharge rate increases the time duration of the ramp comparator function to equal the period T, as indicated by the dotted line waveform *b*. With the duration of the ramp comparator function thus extended, any possible sample is taken during the duration of the ramp comparator function. Every sample hence generates a phase error signal to be used in bringing the system into lock with the reference frequency signal. As voltage controlled oscillator 110 is brought into a locked condition with the reference frequency signal, the duration of the ramp comparator function decreases in time until only the high gain ramp function waveform *a* remains for the short period of time *t* thus providing the desired high gain phase control loop response. Should the voltage controlled oscillator 110 subsequently drop out of lock with the reference frequency signal, the duration of the ramp comparator function is again extended until phase lock with the reference frequency signal is again achieved.

Figure 2:
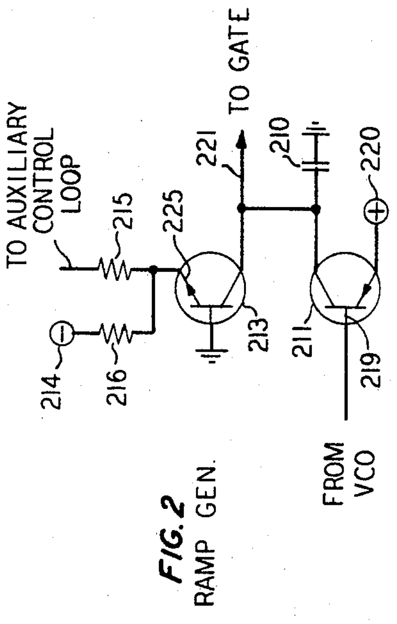
FIG. 2 is a circuit schematic of a ramp function generator which may be used in the embodiment of FIG. 1.

The circuit details of a ramp funtcion generator suitable for use in FIG. 1 are shown in FIG. 2. The storage capacitor 210 is charged to some fixed potential value supplied by the potential source 220. This fixed potential is applied to the storage capacitor 210, via a gating transistor 211, responsive to the signal output of the voltage controlled oscillator applied to it, via lead 219. The potential of the capacitor 210 is applied to a subsequent sampling gate, via lead 221. To generate the ramp comparator function, the charged capacitor 210 is discharged, via the discharge control transistor 213 at a rate determined by the current drain established at the emitter 225. The current drain at the emitter 225 is established by the current drawn by the auxiliary control loop, via the resistor 215. The action of the auxiliary control loop in establishing this current drain is described below. A minimum is set on the current drain at the emitter 225 by the negative potential source 214 connected to the emitter 225, via the resistor 216. This limit insures that the duration of the ramp comparator function will not exceed the time T.

In the operation of the ramp function generator, if the voltage controlled oscillator is in phase lock, the current drain, discharging the capacitor 210, is largely controlled by the auxiliary control loop. This current drain at least equals and normally exceeds the current drain absorbed by the potential source 214. During the period of phase lock, the combined current drain of the auxiliary control loop and the potential source 214 establishes the duration of the ramp function at some time value *t* which is substantially less than the period T of the voltage controlled oscillator. If the voltage controlled oscillator is not in phase lock and the sampling occurs outside of the duration of the ramp comparator function, the current drain absorbed by the auxiliary control loop is gradually diminished to some minimum value. The low fixed current drain of the potential source 214 prevents the combined current drain from falling below some threshold value. Hence the current drain of the emitter 225 is decreased, and the rate of discharge of the capacitor 210 is decreased. The decreased rate of discharge increases the duration of the ramp compartor function to the time T again to permit sampling of the ramp comparator function. The operation of the ramp function generator is again considered hereinbelow with reference to the auxiliary control loop disclosed in FIG. 3.

Figure 3:
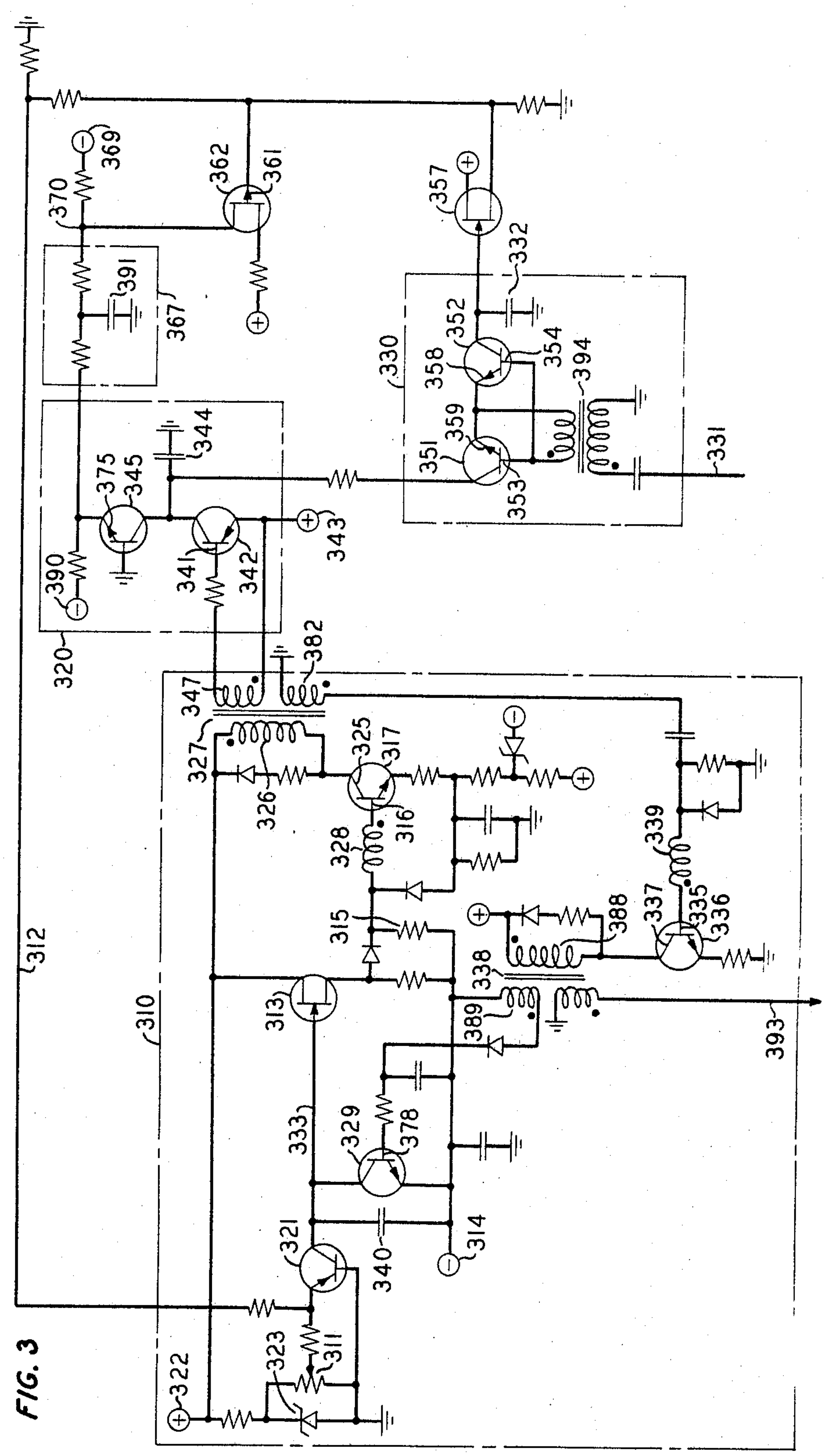
FIG. 3 is a detailed circuit schematic of a phase controlled oscillator system in accord with the block diagram of FIG. 1.

A circuit schematic of a phase lock oscillator system, in accord with the invention, is shown in FIG. 3. The oscillator 310 is a relaxation type oscillator whose oscillatory period is controlled by the charging rate of a timing capacitor 340. The signal output of the oscillator 310 is utilized to trigger a ramp function generator 320. The ramp function generator 320, in response thereto, during phase lock generates a ramp comparator function having a duration time *t* which is considerably less than the oscillatory period T of the oscillator 310. If a very high phase loop gain is desired, time duration *t* should be less than the period T by an order of magnitude. The amplitude of the ramp comparator function is sampled by a sampling gate 330 operating in response to a reference frequency signal applied to input lead 331. The sampled amplitudes of the ramp comparator function are applied to a storage capacitor 332. The resultant signal level, designated the phase error signal, attained in the storage capacitor 332 is applied, via the phase control loop 312, to the charging circuit of the relaxation oscillator 310 to control the charging rate of the timing capacitor 340. Thus, by controlling the charging rate of the timing capacitor 340, the frequency of the relaxation oscillator 310 is made responsive to the phase error signal level in the phase control loop.

An auxiliarly control loop utilizes the phase error signal to control the duration of the ramp comparator function generated by the ramp function generator 320. The system is designed to increase the duration of the ramp comparator function if the sampled periods fall outside of the normal duration of the ramp comparator function.

More specifically, the relaxation oscillator 310 comprises an n-p-n transistor 317 having its collector 325 connected to the primary winding 326 of the pulse transformer 327. The base 316 is connected to the secondary winding 328 of the pulse transformer 327.

Initially, the timing capacitor 340 is in a discharged state. The field effect transistor 313 in response thereto is in a nonconductive condition blocking the application of the positive voltage from potential source 322 to the base 316 of transistor 317. Hence, the negative potential of the potential source 314 is applied, via the resistor 315, to the base 316 thereby biasing the transistor 317 into a nonconducting condition. The timing capacitor 340, however, is being charged positively by the potential source 322, via a potentiometer 311 and a charge control transistor 321 connected in a common base mode. A Zener diode 323 shunted across the potentiometer impedance maintains a constant voltage drop across it, thereby drawing a constant current from the potential source 322. The current to be supplied by the potential source 322 to the charge control transistor 321 is determined by the positioning of the wiper arm on the impedance of the potentiometer 311. The conductor path of the phase control loop 312 is also connected to the charge control transistor 321 and represents a supplementary source of charging current. This added source of charging current is utilized to modify the charging rate of the timing capacitor 340 in accord with the phase error signal.

The timing capacitor 340 is charged continuously and gradually acquires a positive potential which is applied, via lead 333, to the field effect transistor 313. At a particular potential level, the field effect transistor 313 is biased into a conducting state, and the positive potential of the potential source 322 is transmitted to the base 316 of the transistor 317. When the positive voltage transmitted by the field effect transistor 313 achieves a certain threshold level, the transistor 317 is biased into a conducting condition.

With the transistor 317 biased into its conducting condition, current, supplied by the source 322, begins to flow through the primary winding 326 of the transformer 327. This initial current flow induces a voltage in the secondary winding 328 which drives the base 316 more positive, hence driving the transistor 317 further into its conducting region. This regenerative action is continued until the transistor 317 is biased into its saturation region. When saturation is reached, the collector-emitter current of transistor 317 can no longer increase, and the regenerative action ceases. Hence the field established in the transformer 327 collapses and induces a negative voltage response in the secondary winding 328. This negative voltage drives the transistor 317 into a nonconducting state. The pulse output of transistor 317 is relatively short in duration compared to the time *t* in order to limit the charging time of the capacitor 344 of the ramp generator 320. Hence, the unstable region of the ramp comparator function is limited to a very small time interval as compared with the time interval *t*.

The pulse output of the relaxation oscillator 310 is coupled, via the secondary winding 382, to the base 335 of an n-p-n transistor 336. This pulse output biases the transistor 336 into a conducting condition. The collector 337 of the transistor 336 is connected to the primary winding 388 of a pulse transformer 338. This primary winding 388 is regeneratively connected to a secondary winding 339 which is connected to the base 335. The transistor 336, turned on in response to the signal supplied by the secondary winding 382, reacts in a regenerative fashion identical to the regenerative action described above.

The output pulse developed in the secondary winding, 389 as a result of the regenerative action, is applied to the base 378 of the transistor 329. The collector-emitter path of the transistor 329 shunts the timing capacitor 340. The output pulse biases the transistor 329 into its conductive region to discharge the timing capacitor 340. The output pulse of the transistor 336 is substantially longer in duration than the output pulse of the transistor 317. This is to insure that the transistor 329 is biased into a conducting state long enough to adequately discharge the timing capacitor 340. The phase locked signal output is supplied for external use on lead 393 and is derived from the regenerative action driving the transistor 336 into saturation. It is to be understood that a useful phase locked signal output could be just as readily derived from the regenerative action driving the transistor 317 into saturation.

The pulse output produced in the secondary winding 347 of transformer 327 is applied to the base 341 of the transistor 342. This negative pulse biases the transistor 342 into its conducting region permitting the positive potential source 343 to charge the capacitor 344. The pulse is preferably of very short duration so that the slope of the charging current is very great and the charging time very short as compared to the subsequent duration and slope of the discharge of the capacitor 344. The charge stored on the capacitor 344 is discharged, as described above with reference to FIG. 2, via the collector-emitter path of the transistor 345. This discharge rate may be altered to extend the duration of the ramp comparator function by altering the current drain of the transistor 345. This current drain is altered in response to the phase error signal applied thereto, via the auxiliary control loop, as described below.

The potential of the capacitor 344 is sampled by the sampling gate 330 in response to the reference frequency signal applied to it, via input lead 331. The sampling gate 330 comprises two transistors 351 and 352 having their emitters 358 and 359 connected in common to one terminal of the transformer 394. Their bases 353 and 354, are connected in common to the other terminal of the transformer 394. The transformer couples these terminals to the reference frequency signal. The reference frequency signal is preferably a periodic pulse train signal having short duration pulses.

In the absence of the enabling pulses of the reference frequency signal, the collector emitter paths of the transistors 351 and 352 have a very high impedance and do not conduct. When a pulse due to the reference frequency signal is applied to the bases 353 and 354 and exceeds a positive threshold value referenced to the potential of the emitter 358 and 359, the transistors 351 and 352 become forward biased creating a low impedance state in their collector-emitter paths permitting current conduction therein.

With the transistors 351 and 352 conducting, the gate 330 interconnects the capacitors 344 and 332 in parallel permitting a charge transfer therebetween. Hence a signal level is established on the capacitor 332 which is related to the charge level on the capacitor 344 at the instant of sampling. This signal level established on the capacitor 332 is utilized as a phase error signal. This phase error signal is transmitted, via the field effect transistor 357 and the phase control loop 312, to the charging control transistor 321. If the reference frequency signal and the output of the oscillator 310 are not in phase alignment, this phase error signal alters the rate of charging of the timing capacitor 340 by altering the emitter current of the charging control transistor 321. The high input impedance of the field effect transistor 357 advantageously prevents the leakage of the charge stored on the capacitor 332 into the phase control loop 312.

The signal level or phase error established on the capacitor 332 is also utilized in accord with the invention to control the duration of the ramp comparator function generated by the ramp function generator 320. The phase error signal is applied, via at field effect transistor 357, to the control electrode 361 of the field effect transistor 362. The field effect transistor 362 utilizes the phase error signal to control the potential of the junction 370 interconnecting the potential source 369 and the low pass filter 367. The potential of the junction 370 is applied to the emitter 375 of the transistor 345, via the low pass filter 367. This potential level established at the junction 370 determines the current drain at the emitter 375. This current drain in turn controls the rate of discharge of the capacitor 344.

If the sample time intervals coincide with the duration of the ramp comparator function, the phase error signal biases the field effect transistor 362 into a nonconducting condition and hence the potential at the junction 370 is sufficiently negative to draw a large current from the emitter 375 of the transistor 345. This large current drain discharges the capacitor 344 within the duration time *t*.

If the sample time intervals occur outside the existing ramp comparator function duration *t*, the field effect transistor 362 is biased into a conducting condition and the potential of the junction 370 increases in a positive direction. This potential is applied, via the low pass filter 367, to the emitter 375 of the transistor 345 and decreases its current drain. This decreased current drain retards the rate of discharge of the capacitor 344 and increases the duration of the ramp comparator function to the time T. With this increase in the duration of the ramp comparator function, the sample time intervals now coincide with the extended ramp comparator function and produce a phase error signal. Upon the application of this phase error signal to the field effect transistor 362, the potential of the junction 370 gradually returns to its quiescent negative potential. The potential previously stored on the capacitor 391 of the low pass filter 367 during the positive excursion of junction 370 is now gradually dissipated. Hence the ramp comparator function slowly decreases in duration with each successive sample of the phase error signal until its duration time is at the normal operating value *t*. The low pass filter 367 advantageously delays the application of the changes of potential of the junction 370, as applied to the emitter 375 of the transistor 345, to inhibit oscillatory action in the auxiliary control loop.

It is apparent from the foregoing that whenever the phase error signal deviates from the normal value to an extent indicating that the ramp comparator function is no longer being sampled, the action of the auxiliary control loop will extend the duration of the ramp comparator function by altering the discharge rate of the capacitor 344 until normal sampling is re-established. With the re-establishment of normal sampling, the duration of the ramp comparator function is decreased. This increases the slope of the ramp and hence increases the gain of the phase control loop. It is to be understood that while the invention has been described with a sampling type phase comparator, the principles of the invention are equally applicable to other types of phase comparators having a similar response characteristic.

While the above invention has been described with respect to one particular embodiment, it is to be understood that various other embodiments including component and polarity changes may be devised by those skilled in the art without departing from the spirit and scope of the invention.

What is claimed is:

1. A phase controlled oscillator system comprising in combination, a voltage controlled oscillator, a source of reference frequency signals, phase comparison means to compare the respective phases of an output signal of said voltage controlled oscillator and said reference frequency signals and generate a phase error signal to control the frequency of said voltage controlled oscillator, said phase comparison means having a ramp function response for a limited time duration substantially less than the period of said output signal, and means to increase the time duration of said ramp function response if the phase separation of said output signal and said reference frequency signals exceeds a certain minimum value.

2. In combination, a voltage controlled oscillator, a source of reference frequency signals, phase comparison means to compare the phase relation of the output of said oscillator and said reference frequency signals, said phase comparison means including means to generate a ramp comparator function in response to the output of said oscillator, said ramp comparator function having a duration substantially less than the oscillatory period of said oscillator, means to sample the amplitude of said ramp comparator function in response to said reference frequency signals and derive a phase error signal therefrom, means to utilize said phase error signal to bring the output of said oscillator and said reference frequency signals into a predetermined phase relationship, and means to increase the duration of said ramp comparator function to equal said oscillatory period to hasten the attainment of said predetermined phase relationship if the time intervals of said samples do not coincide with said ramp comparator function.

3. The combination as defined in claim 2 wherein said means to increase the duration of said ramp comparator function comprises auxiliary control loop means to utilize said phase error signals to control the duration of the ramp comparator function by altering timing arrangements of said means to generate a ramp comparator function.

4. The combination as defined in claim 3 wherein said auxiliary control loop means includes means to prevent oscillatory hunting in the establishment of a static operating arrangement.

5. A phase controlled oscillator system comprising in combination, a voltage controlled oscillator, ramp comparator function generation means responsive to said voltage controlled oscillator, said ramp comparator function generation means generating a ramp comparator function whose duration is an order of magnitude less than the oscillatory period of said voltage controlled oscillator, a source of reference frequency signals, phase comparison means to compare the respective phases of said ramp comparator function and said reference frequency signals and including means to generate a phase error signal indicative of a phase separation between said ramp comparator function and said reference frequency signals, means to apply said phase error signal to said voltage controlled oscillator to alter the frequency therein to counter said phase separation of said ramp comparator function and said reference frequency signals, and means to increase the duration of said ramp comparator function to equal the period of said voltage controlled oscillator if said ramp comparator function and said reference frequency signals are separated in phase by at least some predetermined phase difference.

6. A phase controlled oscillator system as defined in claim 5 wherein said means to increase the duration of said ramp comparator function includes an auxiliary control loop means to utilize said phase error signal to control the duration of the ramp comparator function by altering timing arrangements of said ramp function generation means.

7. A phase controlled oscillator system as defined in claim 6 wherein said auxiliary control means includes stabilizing means to prevent undamped oscillations in the means to increase the duration of the ramp comparator function.

8. A phase controlled oscillator system comprising in combination, a voltage controlled oscillator, a source of reference frequency signals, phase comparison means to compare the respective phases of output signals of said voltage controlled oscillator and said reference frequency signals, said phase comparison means including means to generate a ramp comparator function in response to said output signals of said voltage controlled oscillator, said ramp comparator function having a duration substantially less than the period of said output signal of said voltage controlled oscillator, said phase comparison means further including gating means responsive to said reference frequency signals to gate samples of said ramp comparator function, energy storage means to derive a phase error signal from said samples of said ramp comparator function, means to apply said phase error signal to said voltage controlled oscillator to adjust its frequency to bring it into a definite phase relationship with said reference frequency signals and means to apply said phase error signal to said means to generate a ramp comparator function, said means to generate a ramp comparator function including means to extend the duration of the ramp comparator function when said phase error signal falls below some predetermined value.

9. A phase controlled oscillator system as defined in claim 8 wherein said means to generate a ramp comparator function comprises charge storage means, means to discharge said charge storage means, and said means to extend the duration of the ramp comparator function including means to alter the rate of discharge of said charge storage means.

No references cited.

JOHN KOMINSKI, Primary Examiner

U.S. Cl. X.R.

331—4, 8